United States Patent
Han et al.

(10) Patent No.: US 8,233,426 B2
(45) Date of Patent: Jul. 31, 2012

(54) APPARATUS AND METHOD FOR TRANSMITTING AND RECEIVING PACKET DATA USING MULTIPLE ANTENNAS IN A WIRELESS COMMUNICATION SYSTEM

(75) Inventors: Jin-Kyu Han, Suwon-si (KR); Dae-Gyun Kim, Seongnam-si (KR); Jin-Weon Chang, Suwon-si (KR); Hwan-Joon Kwon, Suwon-si (KR); Youn-Sun Kim, Seognam-si (KR); Dong-Hee Kim, Yongin-si (KR); Cheol Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 917 days.

(21) Appl. No.: 11/579,771

(22) PCT Filed: Jun. 23, 2005

(86) PCT No.: PCT/KR2005/001963
§ 371 (c)(1),
(2), (4) Date: Oct. 9, 2007

(87) PCT Pub. No.: WO2006/006770
PCT Pub. Date: Jan. 19, 2006

(65) Prior Publication Data
US 2008/0192683 A1    Aug. 14, 2008

(30) Foreign Application Priority Data
Jun. 23, 2004    (KR) .................. 10-2004-0047319

(51) Int. Cl.
*H04B 7/185*    (2006.01)
*H04B 7/00*    (2006.01)
*H04W 4/00*    (2009.01)
*H04W 1/00*    (2006.01)
*H03C 7/02*    (2006.01)

(52) U.S. Cl. ..... 370/318; 370/329; 455/101; 455/562.1; 455/522

(58) Field of Classification Search .................. 370/318, 370/329; 455/522, 69; 375/267
See application file for complete search history.

(56) References Cited

U.S. PATENT DOCUMENTS

| | | | |
|---|---|---|---|
| 5,406,593 A | | 4/1995 | Chennakeshu et al. |
| 7,412,212 B2* | | 8/2008 | Hottinen ................ 455/101 |
| 2001/0038356 A1 | | 11/2001 | Frank |
| 2002/0196842 A1 | | 12/2002 | Onggosanusi et al. |
| 2003/0130003 A1* | | 7/2003 | Won ........................ 455/522 |
| 2004/0196919 A1* | | 10/2004 | Mehta et al. ............ 375/267 |

FOREIGN PATENT DOCUMENTS

| | | |
|---|---|---|
| EP | 1376895 A2 | 1/2004 |
| RU | 2116698 | 7/1998 |
| RU | 2190308 | 9/2002 |
| WO | WO 02/03557 | 1/2002 |
| WO | WO0239763 | 5/2002 |
| WO | 02082689 A2 | 10/2002 |
| WO | WO 02/103926 | 12/2002 |
| WO | 2004032401 A1 | 4/2004 |
| WO | WO 2004/039011 | 5/2004 |

* cited by examiner

*Primary Examiner* — Lester Kincaid
*Assistant Examiner* — Kuo Woo
(74) *Attorney, Agent, or Firm* — Roylance, Abrams, Berdo & Goodman, LLP (57) ABSTRACT

An apparatus and method for transmitting and receiving packet data using multiple antennas in a wireless communication system is provided. In a wireless communication, system using multiple antennas, the apparatus and method can efficiently transmit and receive packet data according to channel conditions without a waste of transmission bandwidth.

12 Claims, 7 Drawing Sheets

APPARATUS AND METHOD FOR TRANSMITTING AND RECEIVING PACKET DATA USING MULTIPLE ANTENNAS IN A WIRELESS COMMUNICATION SYSTEM

BACKGROUND OF THE INVENTION

1. Field of the Invention

The present invention relates generally to an apparatus and method for transmitting and receiving packet data in a wireless communication system, and in particular, to an apparatus and method for transmitting and receiving packet data in a wireless communication system using multiple antennas.

2. Description of the Related Art

In general, a mobile communication system is the most typical wireless communication system. The mobile communication system has developed based on voice communication. However, with the increasing user demand for and the rapid progress of communication technology, the mobile communication system is now evolving into an advanced system capable of transmitting high-speed, high-quality multimedia data. The mobile communication system is roughly classified into a synchronous system and an asynchronous system. As for the asynchronous system, many researches and standardization works on High Speed Downlink Packet Access (HSDPA) are being conducted in $3^{rd}$ Generation Partnership Project (3GPP). In addition, as for the synchronous system, many researches and standardization works on 1x Evolution-Data Voice (EV-DV) are being conducted in $3^{rd}$ Generation Partnership Project 2 (3GPP2). The researches and standardization works are the representative attempts to find a solution for a high-speed (2 Mbps or higher), high-quality radio packet data transmission service in a $3^{rd}$ generation (3G) mobile communication system.

A $4^{th}$ generation (4G) mobile communication system aims at providing a higher-speed, higher-quality multimedia service compared with the multimedia service provided in the 3G mobile communication system. As a technique for providing a high-speed, high-quality data service in the wireless communication system, a multi-antenna technique is now under serious discussion. A description will now be made of the multi-antenna technique.

The multi-antenna technique used for a transmitter and a receiver of the wireless communication system adopts Multi-Input Multi-Output (MIMO) technology. It is known that the multi-antenna technique transmits data using multiple antennas, thereby increasing a data rate in linear proportion to the number of transmission/reception antennas without an additional increase in frequency bandwidth. The multi-antenna technique will be described in more detail herein below. A multi-antenna system has two or more transmission antennas and two or more reception antennas. The number of the reception antennas must be greater than or equal to the number of transmission data streams. In this system, a transmission side can transmit data through the antennas in parallel. Then a reception side can receive the transmitted data using a plurality of antennas. Therefore, the system can increase a data rate without an additional increase in bandwidth.

The multi-transmission/reception antenna technique applied to the system can be classified into a spatial diversity technique and a spatial domain multiplexing technique according to the number of data streams transmitted simultaneously.

In the spatial diversity technique, a transmitter transmits only one stream. The spatial diversity technique has been developed to suppress a deterioration of link performance due to the fading occurring in a mobile communication channel. Therefore, the spatial diversity technique, as it transmits only one stream, is appropriate for the service whose allowable delay time for transmission data is limited, such as voice call, video call, and broadcasting services. On the contrary, the spatial domain multiplexing technique transmits multiple streams. The spatial domain multiplexing technique has been developed to increase a data rate, guaranteeing constant link performance. Therefore, compared with the spatial diversity technique, the spatial domain multiplexing technique is suitable for a packet data service having a longer allowable delay time.

A multi-transmission/reception antenna system can be classified into an open loop system and a closed-loop system according to whether channel status information (CSI) is fed back from a receiver. The open loop multi-antenna system is used when a transmitter receives no CSI being fed back from the receiver, and the closed-loop multi-antenna system is used when the transmitter receives a CSI being fed back from the receiver.

The current 3G wireless packet data communication system such as HSDPA and 1xEV-DV, which are under standardization or commercialization, uses a link adaptation technique such as an Adaptive Modulation and Coding (AMC) technique and a scheduling resource management technique to improve transmission efficiency. The link adaptation technique receives partial channel status information being fed back from a receiver and applies an appropriate modulation and coding scheme (MCS) determined to be the most effective according to the received partial channel status information. Therefore, the multi-antenna technique classified as the closed-loop spatial domain multiplexing technique is most effective in the wireless packet data communication system.

However, the spatial domain multiplexing technique is not always applicable to the multi-antenna system. When multiple streams are transmitted over the channels having a very high spatial correlation or a very low signal-to-noise ratio (SNR), an error rate increases, disabling stable communication. Therefore, a transmitter requires an adaptive multi-antenna technique for selecting an effective technique based on a channel status report from a receiver.

It is known that in communication between one multi-antenna transmitter and one multi-antenna receiver, the data capacity serviceable through the spatial domain multiplexing technique increase in linear proportion to the number of transmission/reception antennas. However, the recent research has proven that when communication is performed between one transmitter and a plurality of receivers like in the forward link, the conventional spatial domain multiplexing technique cannot obtain the linear increase in the data capacity and a spatial domain multiple access technique can overcome the difficulty. A multiple access technique simultaneously transmits data to a plurality of receivers. The multiple access technique includes Time Domain Multiple Access (TDMA) for dividing time resources to secure channels for multiple users, Frequency Domain Multiple Access (FDMA) for dividing frequency resources, and Code Domain Multiple Access (CDMA) for dividing code resources. However, the spatial domain multiple access technique divides spatial resources, sharing the time, frequency, and code resources, thereby to secure multiple user channels.

However, the spatial domain multiple access technique is not always applicable to the multi-antenna system. Like the spatial domain multiplexing technique, the spatial domain multiple access technique is applicable or not applicable to the multi-antenna system depending on the channel status. For example, if a correlation between channels for two users is high, the two users cannot be spatially separated. In this case, the use of the spatial domain multiple access technique increases an error rate, making it impossible to perform stable communication. Therefore, in order to improve the data transmission capacity through the multi-antenna system, there is a need for a technique for adaptively selecting one of the spatial diversity technique, the spatial domain multiplexing technique, and the spatial domain multiple access technique according to channel status.

As described above, the multi-antenna technique is roughly classified into the spatial diversity technique and the spatial domain multiplexing technique. The spatial diversity technique includes a transmission diversity technique using multiple antennas for a transmitter, and a reception diversity technique using multiple antennas for a receiver. The reception diversity technique can increase an average of received SNRs and reduce dispersion of the received SNRs. Therefore, the reception diversity technique, when applied to packet data communication, contributes to an increase in the data rate. However, the transmission diversity technique, in which a transmitter does not take the CSI into account, uniformly distributes the total transmission power to the antennas, making it difficult to expect an improvement in the average of the received SNRs. The transmission diversity technique merely reduces the dispersion of the received SNRs. In packet data communication for which a scheduler is used, a transmitter selects a receiver with the highest transmission efficiency among several receivers every predetermined time and transmits data to the selected receiver. Therefore, for the same average of the received SNRs, a technique of increasing the dispersion can improve the data transmission efficiency. As a result, the transmission diversity technique in which the CSI is not taken into account is rather inferior to the single-antenna technique in terms of the data transmission efficiency. However, the spatial diversity technique in which the CSI is taken into account can improve the average of the received SNRs, contributing to an increase in the data transmission efficiency.

The typical transmission diversity technique in which the CSI is not taken into account is Space Time Coding (STC), and the transmission diversity technique in which the CSI is taken into account includes Selective Transmit Diversity (STD) and Transmit Adaptive Array (TxAA). In STD, a receiver informs a transmitter of an antenna having the best channel status among multiple transmission antennas and then the transmitter transmits signals through the antenna. In TxAA, a receiver transmits a complex response of an estimated channel to a transmitter and then the transmitter performs beamforming so that a base station maximizes an SNR. In the transmission diversity technique in which the CSI is taken into account, the CSI taken into account by the transmitter is information indicating an antenna having the best channel status, for STD, and a complex response of a channel, for TxAA.

Also, the spatial domain multiplexing technique is classified into a technique in which the CSI is not taken into account and another technique in which the CSI is taken into account. The CSI-independent technique cannot but transmit the same amount of data all over the transmission antennas. Therefore, a receiver requires a method for minimizing an error rate in this situation. On the contrary, the CSI-dependent technique can transmit the different amount of data through each transmission antenna. The CSI-dependent technique includes a Per Antenna Rate Control (PARC) technique. A PARC transmitter receives a CSI for each antenna, being fed back from a receiver. Based on the feedback CSI, the PARC transmitter selects an MCS for transmission of a greater amount of data for an antenna having the better channel status, and selects an MCS for transmission of a less amount of data for an antenna having the poorer channel status. The PARC transmitter will now be described in more detail.

Figure 1:
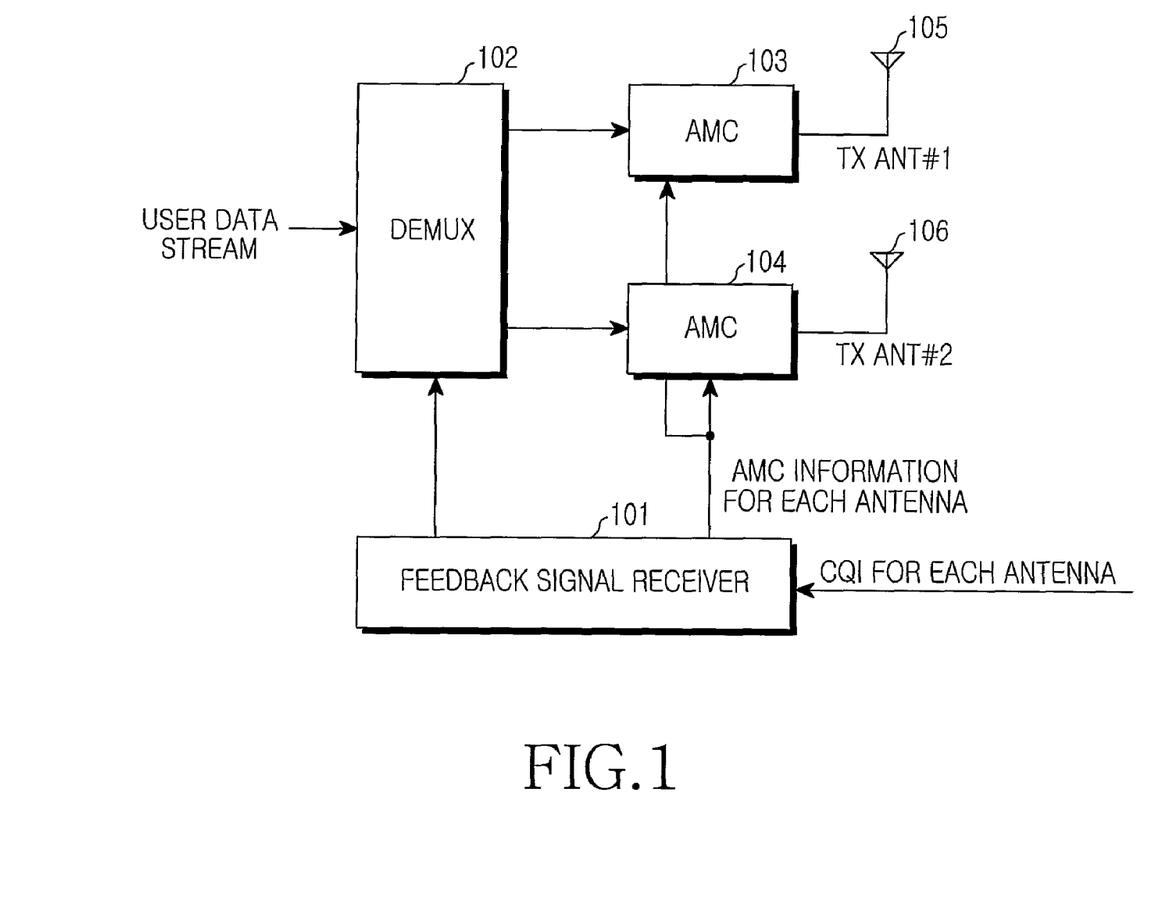
FIG. 1 is a block diagram illustrating an exemplary internal structure of a PARC transmitter.

FIG. 1 is a block diagram illustrating an exemplary internal structure of a PARC transmitter. With reference to FIG. 1, a detailed description will now be made of an internal structure and operation of a PARC transmitter.

Although two transmission antennas are provided in FIG. 1 by way of example, the number of transmission antennas is extensible. However, a receiver should satisfy the prerequisite that the number of reception antennas should not be less than the number of the transmission antennas in order to distinguish different streams transmitted from different transmission antennas. A description of a method for measuring, by a receiver, channel quality information (CQI) for each transmission antenna and receiving the measured CQI will not be given with reference to FIG. 1. In other words, it will be assumed that the transmitter of FIG. 1 receives a CQI for each antenna from the receiver.

As illustrated in FIG. 1, a CQI for each antenna is input to a feedback signal receiver 101. The feedback signal receiver 101 delivers the CQI for each antenna to a demultiplexer (DEMUX) 102 and an AMC block 103. The demultiplexer 102 receives a user data stream to be transmitted, and demultiplexes the transmission user data stream into two substreams according to the information received from the feedback signal receiver 101 such that the substreams are transmitted through the corresponding antennas. The demultiplexing process performs demultiplexing such that the greater amount of information is provided to an antenna having the better channel status. Herein, a stream output from the demultiplexer 102 will be referred to as a substream. The substreams separated for the individual antennas are input to independent AMC blocks 103 and 104, respectively. The AMC blocks 103 and 104 perform modulation and coding appropriate for the channel status of the corresponding transmission antennas according to the information received from the feedback signal receiver 101. The substreams, after being subject to the modulation and coding process, are transmitted to the receiver through the transmission antennas 105 and 106.

Theoretically, to maximize the data transmission efficiency, the spatial domain multiplexing technique adapts a method for performing singular value decomposition (SVD), with the channel status known to both the transmitter and the receiver, to form multiple interference-free subchannels from a multi-antenna channel, and selecting appropriate modulation scheme, coding scheme, and allocated power for each subchannel. This method is called "SVD MIMO." However, in the actual mobile communication environment, because the transmitter cannot accurately estimate transmission channels, there is a limitation in realizing SVD MIMO. Therefore, a Per Stream Rate Control (PSRC) technique has been proposed as a technique that restrictively uses SVD MIMO.

In the PSRC technique for restrictively implementing SVD MIMO, a receiver estimates a multi-antenna channel and determines a preprocessed matrix to be used in a transmitter according to the estimation result. If there is no limitation in the amount of feedback information and there is no error occurring in the feedback process, the preprocessed matrix will be a unitary matrix obtained by performing SVD on a multi-antenna channel expressed in the form of a matrix. In reality, however, this cannot be realized, because the feedback information is quantized information. Therefore, the PSRC technique uses a method in which a receiver selects the most preferred preprocessed matrix among a predetermined number of candidate preprocessed matrixes, and informs a transmitter of the selected preprocessed matrix.

In this method, the transmitter multiplies a transmission signal by the selected preprocessed matrix and transmits the resultant data, and multiple beams are formed in this process. Therefore, in the PSRC system, a receiver informs a transmitter of a multi-beam forming method appropriate for its channel so that the transmitter forms multiple beams appropriate for the corresponding user. Based on the information, the transmitter allocates data streams to the formed beams on one-to-one basis to simultaneously transmit a plurality of data streams, realizing the spatial domain multiplexing technique. Because the transmitter allocates data streams to the formed beams before transmission, the receiver additionally transmits channel status information of each beam to the transmitter so that the transmitter can adaptively manage the amount of information for the data transmitted through each beam. That is, the transmitter selects an MCS such that the greater amount of information can be transmitted through a beam having the better channel status, and selects an MCS such that the less amount of information can be transmitted through a beam having the poorer channel status. A description will now be made of the PSRC transmitter.

Figure 2:
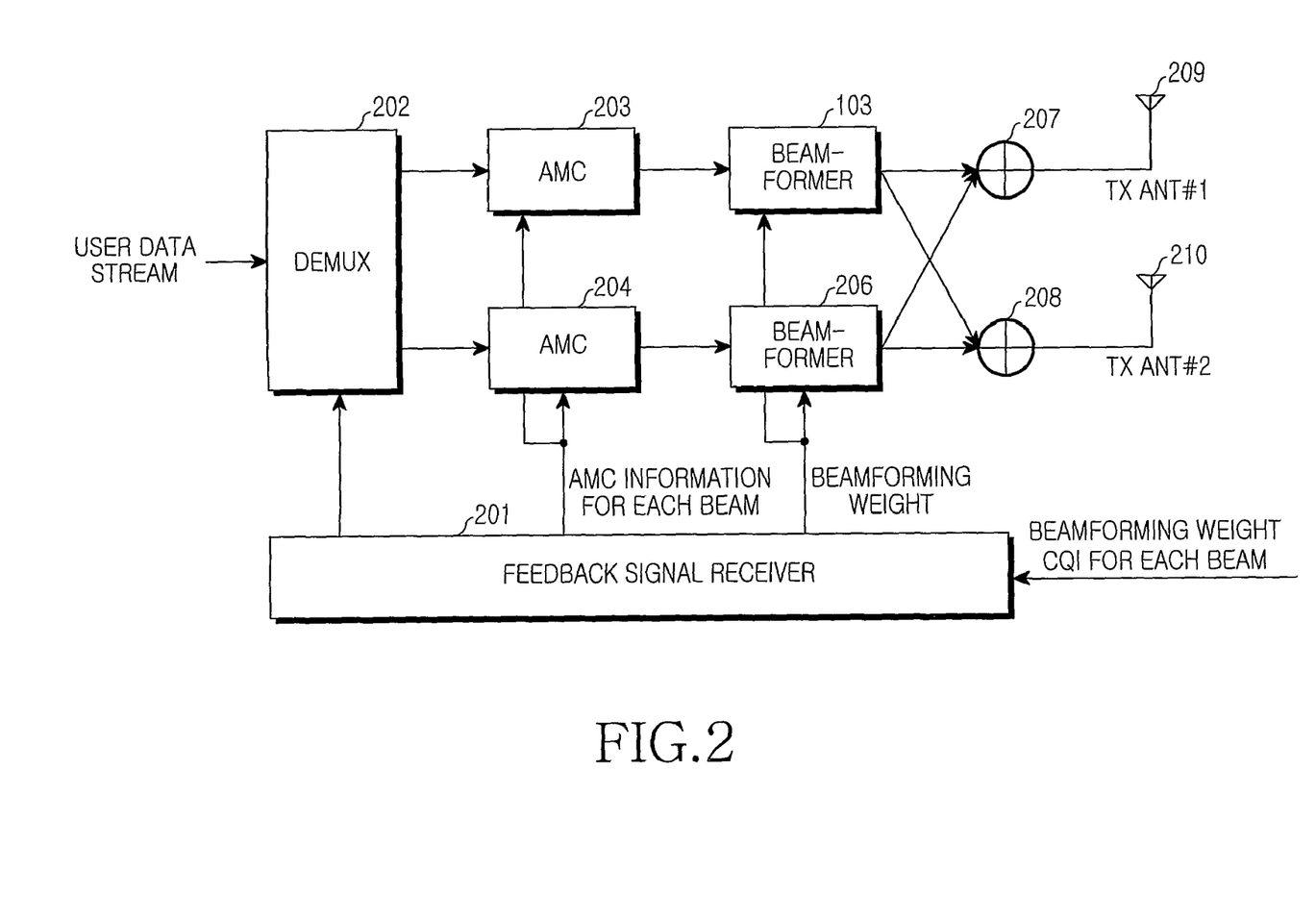
FIG. 2 is a block diagram illustrating an exemplary internal structure of a PSRC transmitter.

FIG. 2 is a block diagram illustrating an exemplary internal structure of a PSRC transmitter. With reference to FIG. 2, a detailed description will now be made of an internal structure and operation of a PSRC transmitter.

Although two transmission antennas are provided in FIG. 2 by way of example, the number of transmission antennas is extensible. However, a receiver should satisfy the prerequisite that the number of reception antennas should not be less than the number of the transmission antennas in order to distinguish different streams transmitted from different transmission antennas. A description of a method for measuring, by a receiver, a CQI for each transmission antenna and receiving the measured CQI will not be given with reference to FIG. 2. In other words, it will be assumed that the transmitter of FIG. 2 receives a CQI for each antenna from the receiver.

A feedback signal receiver 201 of the transmitter receives a beamforming weight and CQI information for each beam, and provides them to a demultiplexer 202, AMC blocks 203 and 204, and beamformers 205 and 206. The demultiplexer 202 receives a user data stream to be transmitted, and demultiplexes the user data stream into as many substreams as the number of antennas such that the substreams are transmitted through the beams. The beam demultiplexing in the demultiplexing process is performed such that the greater amount of information is provided to an antenna having the better channel status. The separated substreams are input to the independent AMC blocks 203 and 204, respectively. Each of the AMC blocks 203 and 204 receives AMC information for a corresponding beam, provided from the feedback signal receiver 201, and modulates and codes the corresponding substream according thereto.

The substreams, after being subject to the modulation and coding process, are transmitted to the beam formers 205 and 206, respectively, and the beam formers 205 and 206 form beams using the weight information provided from the feedback signal receiver 201. The signals output from the beam formers 205 and 206 are input to adders 207 and 208, added therein to the input signals, and then transmitted to a receiver through transmission antennas 209 and 210.

To determine a beamforming method, each receiver feeds back a beamforming weight to the transmitter. An expression method of the feedback beamforming weight follows that of TxAA. Assuming that a transmission antenna #1 is a reference antenna, a TxAA receiver feeds back a ratio of a channel status $\alpha_1$ for the reference antenna to a channel status $\alpha_2$ for a transmission antenna #2, to the transmitter. That is, the receiver feeds back $\alpha_2/\alpha_1$. However, because the amount of feedback information should be limited, a value of $\alpha_2/\alpha_1$ is subject to quantization. In TxAA mode #1, a phase value of $\alpha_2/\alpha_1$ is quantized with 2 bit, and in TxAA mode #2, a phase value of $\alpha_2/\alpha_1$ is quantized with 3 bits and a magnitude value thereof is quantized with 1 bit. A TxAA transmitter forms one beam based on the feedback information and transmits a data stream using the beam.

The PSRC transmitter creates two beams by forming one beam based on the feedback information and additionally forming another beam being orthogonal thereto, and transmits demultiplexed separate substreams with the two beams. Because the PSRC system forms beams based on the quantized feedback information in this manner, it cannot generate interference-free subchannels like SVD MIMO. In addition, because each user requires a beamforming method appropriate for its own channel status, there is a difficulty in extending the PSRC technique to the spatial domain multiple access technique.

The CSI-independent spatial diversity technique like STC contributes to a reduction in dispersion of received SNRs. A technique for reducing the dispersion of received SNRs is effective for the service that restrictively depends on the CSI and requires real-time transmission, such as voice call, video call, and broadcasting services. However, because packet data communication allows a time delay, it uses a scheduling technique and selects an AMC method based on the CSI. Therefore, the technique for reducing the dispersion of received SNRs is not appropriate for wireless packet data communication. For the same reason, the CSI-independent spatial domain multiplexing technique is also not appropriate for the wireless packet data communication.

The CSI-dependent multi-antenna technique has been developed to individually realize the spatial diversity technique or the spatial domain multiplexing technique. Therefore, in order to effectively manage the multi-antenna technique, the transmitter should be implemented such that it selects an appropriate one of the separate CSI-dependent techniques. In this case, the transmitter must transmit, to the receiver, additional information indicating a type of the multi-antenna technique in use, in the process of transmitting data. The transmitter consumes a part of available resource in the process of transmitting the additional information, decreasing transmission efficiency. In addition, the multi-antenna technique does not provide a method implemented for adaptively selecting one of the spatial diversity technique, the spatial domain multiplexing technique and the spatial domain multiple access technique according to the channel status. Accordingly, there is a demand for such a method.

SUMMARY OF THE INVENTION

It is, therefore, an object of the present invention to provide an apparatus and method for effectively transmitting packet data in a wireless communication system using multiple antennas.

It is another object of the present invention to provide an apparatus and method for selecting a transmission technique adaptive to a channel status in a wireless communication system using multiple antennas.

It is further another object of the present invention to provide an apparatus and method for transmitting information on an adaptive transmission technique in use without a waste of a transmission bandwidth in a wireless communication system using multiple antennas.

It is yet another object of the present invention to provide an apparatus and method for internally applying a spatial diversity technique, a spatial domain multiplexing technique, and a spatial domain multiple access technique in a wireless communication system using multiple antennas.

To achieve the above and other objects, there is provided an apparatus for transmitting packet data in a wireless communication system that receives channel status information between multiple transmission antennas and multiple reception antennas as feedback information. The apparatus comprises a feedback signal receiver for receiving the feedback information being fed back from each of receivers; a user classifier for classifying users having transmission data streams into groups using preferred basis transform information output from the feedback signal receiver; a scheduling and demultiplexing block for receiving an output of the user classifier and the feedback information from the feedback signal receiver, selecting at least one of a group with a transmission priority and user data to be transmitted in the corresponding group according to the received information, and outputting the selected substream, adaptive modulation and coding (AMC) information for the selected substream, and power allocation information; an AMC block for modulating and coding a substream output from the scheduling and demultiplexing block according to the AMC information; a power allocator for allocating transmission power to the AMC-processed substream according to the power allocation information; and a transmitter for transmitting the power-allocated substream through each of the transmission antennas.

To achieve the above and other objects, there is provided a method for transmitting packet data in a wireless communication system that receives channel status information between multiple transmission antennas and multiple reception antennas as feedback information. The method comprises the steps of receiving a basis transform matrix and channel quality information (CQI) corresponding thereto, from all of terminals, and classifying users preferring the same basis into groups based on the feedback information; selecting at least one of users desiring to transmit packet data taking into account a priority of the classified group and a priority of a user; classifying the selected user data into substreams, and performing adaptive modulation and coding (AMC) on each of the substreams; allocating power to the AMC-processed substreams; and performing basis transform on each of the power-allocated substreams before transmission.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Before a description of a system configuration proposed in the present invention is given, a system model proposed in the present invention will now be described herein below. The system model proposed in the present invention, described below, must satisfy the following 7 conditions.

(1) The number of receivers for receiving data transmitted from a transmitter is K. Herein, K is an integer larger than 0, and generally has a value of 2 or above.

(2) The number of antennas for the transmitter is $M_T$, and the number of antennas for the receiver is $M_R$. For a frequency selective fading channel, a channel of a multi-transmission/reception antenna system can be expressed with an $M_R \times M_T$ complex matrix H. An element $h_{ij}$ in an $i^{th}$ row and a $j^{th}$ column of the matrix H represents a channel status between a $j^{th}$ transmission antenna and an $i^{th}$ reception antenna. The number of antennas for the receiver can differ for each user. The system proposed in the present invention does not limit the number of reception antennas. However, the system needs to satisfy the prerequisite that the number of reception antennas should not be less than the number of the transmission antennas.

(3) The total transmission power that the transmitter can use to transmit data streams is $P_T$.

(4) A basis transform matrix $E^{(G)}$ is determined as one of the elements of a basis transform matrix set $S=\{E^{(G)}, E^{(G)}, \ldots, E^{(G)}\}$ having G elements. Herein, $E^{(G)}$ is a basis transform weight to be applied to $N_g$ basis transformers in the transmitter, and denotes an $M_T \times N_g$ complex matrix. The transmitter has $N_g$ basis transformers and transmits a different data stream for each basis. Therefore, the maximum value of the number n of the independent data streams transmittable by the transmitter is $N_g$. Which matrix among the elements of the basis transform matrix set will be used as a basis transform matrix is determined in the scheduling process. If a scheduler determines $E^{(g)}$ as a basis transform matrix, an $i^{th}$ basis transform weight becomes an $i^{th}$ column vector $e_i^{(g)}$ of $E^{(g)}=[e_1^{(g)}, e_2^{(g)}, \ldots, e_{N_g}^{(g)}]$. However, different column vectors of $E^{(g)}$ are orthogonal with each other.

(5) The terms "basis" and "basis transform" used herein are defined as follows. Originally, the "basis" refers to basic vectors that can express all of the elements in a vector space. That is, the basis refers to a linear set of basis vectors and expresses all of the elements in the vector space. The basis represents the paths through which different substreams are transmitted, and a process of creating the basis is called "basis transform." The present invention performs "basis transform" in order to convert the existing channel H expressed per "antenna" into an equivalent channel $\tilde{H}$ per "basis." That is, a "basis," which is a new domain, is defined through "basis transform," and a domain without basis transform is an antenna. Therefore, multiple different streams are transmitted through different bases through basis transform. In addition, a process of generating "bases" is called "basis transform," and if there is no separate basis transform, an antenna becomes a basic basis. This corresponds to the case of E=1.

If there is no separate basis transform, each antenna becomes a basis like in PARC, and in the case of PSRC, a basis adaptively forms a beam according to a channel status for each user. A technique proposed through singular value decomposition (SVD) defines G basis transform matrixes and allows a user to select its corresponding basis transform matrix.

The amount of transmission power allocated to each basis is set by dividing the total power, and no transmission power is allocated to a basis through which no data stream is transmitted. That is, the power $P_T$ is uniformly allocated to the bases through which data streams are transmitted, and no power is allocated to the bases through which no data stream is transmitted.

(6) Different modulation/demodulation schemes are used for data streams.

(7) The receiver feeds back, to the transmitter, channel quality information (CQI) for each basis generated when information indicating a preferred basis transform matrix and the corresponding basis transform matrix are used. The information indicating a basis transform matrix is expressed with $\lceil \log_2 G \rceil$ bits. Herein, $\lceil x \rceil$ denotes the smallest one of the integers greater than a value x. For example, for G=2, the receiver must inform the transmitter whether it prefers $E^{(1)}$ or $E^{(2)}$ as a basis transform matrix. To this end, there is a need for 1-bit feedback information. If the receiver prefers $E^{(g)}$, $N_g$ basis transformers are realized in the transmitter. The receiver must calculate a CQI obtained from each of the $N_g$ bases, and transmit the CQI to the base station.

A description will now be made of a system according to the present invention using the system model. The description will be given in the following order.

[1] A channel estimation and feedback method of the receiver will be described using structures of the transmitter and the receiver, and a channel estimation and feedback report process in the receiver will be described using a flowchart.

[2] A structure and operation of the transmitter according to the present invention will be described, and a method in which the transmitter according to the present invention internally applies a spatial diversity technique, a spatial domain multiplexing technique, and a spatial domain multiple access technique will be described using a flowchart.

[3] Finally, an actual example of the multi-antenna system proposed in the present invention will be described. In the final embodiment, the simplest multi-antenna system will be described using detailed values, by way of example.

[1] Channel Estimation and Feedback Method of Receiver

Figure 3:
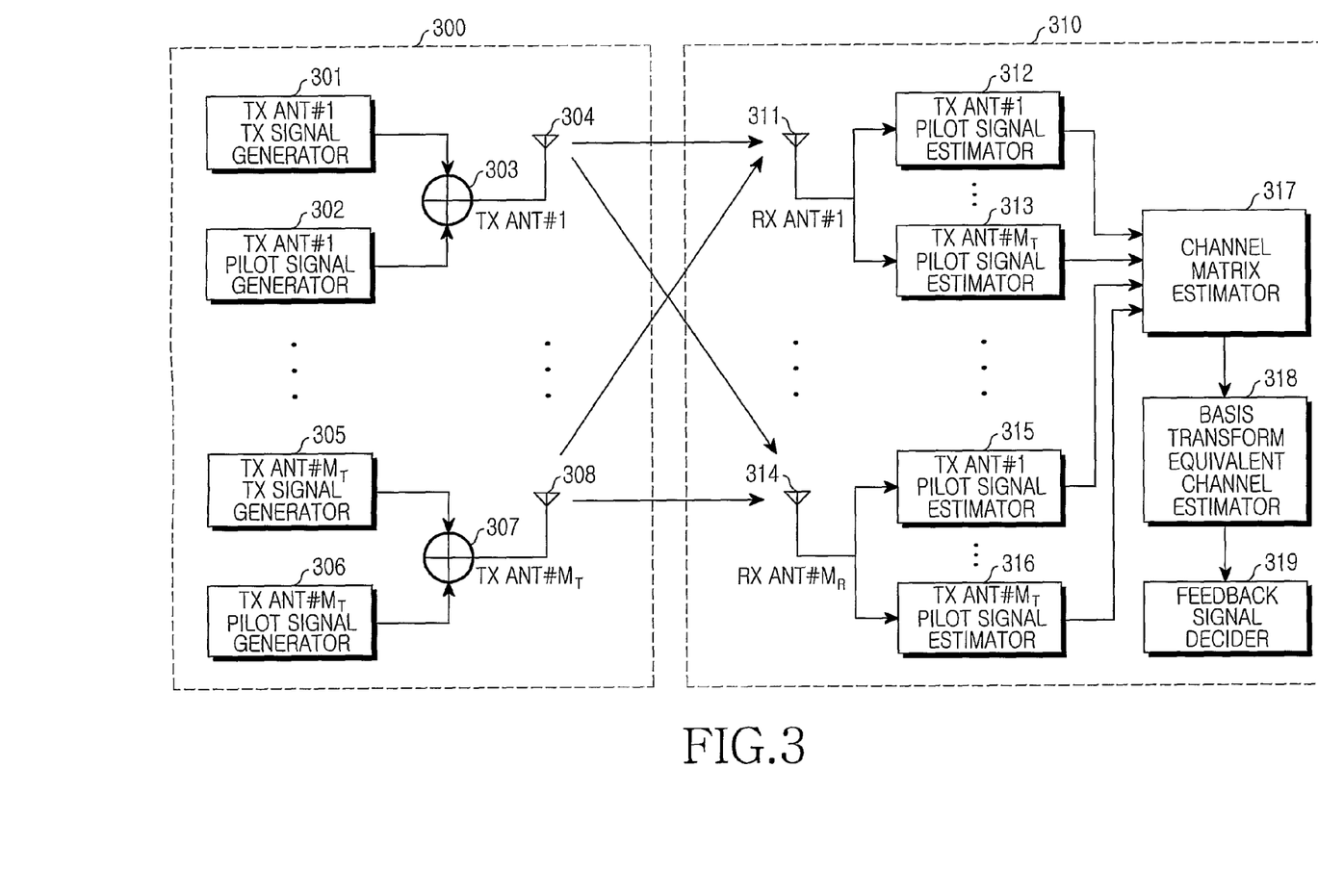
FIG. 3 is a major block diagram of a transmitter and a receiver for transmission of pilot signals and channel estimation according to the present invention.

FIG. 3 is a major block diagram of a transmitter and a receiver for transmission of pilot signals and channel estimation according to the present invention. With reference to FIG. 3, a description will now be made of a major block structure and operation of a transmitter and a receiver for transmission of pilot signals and channel estimation according to the present invention.

Before a description of the structure and operation is given, it should be noted that the transmitter transmits orthogonal pilot signals through individual antennas. The pilot signals should be orthogonal with each other, and should also be orthogonal with transmission data signals. To give orthogonality to the pilot signals, it is general to allocate different Walsh codes to the pilot signals in the CDMA system. Alternatively, it is also possible to allocate different frequencies or times to the pilot signals. The reason for giving orthogonality to the pilot signals is to allow the receiver to estimate channels from different transmission antennas.

Referring to FIG. 3, the structure includes a transmitter 300 and a receiver 310. A structure and operation of the transmitter 300 will now be described. A signal to be transmitted through a first transmission antenna 304 is input to a transmission signal generator 301 for the first transmission antenna, and a pilot signal to be transmitted through the first transmission antenna is input to a pilot signal generator 302 for the first transmission antenna. The signal generators 301 and 302 generate the input signals according to the corresponding methods, and output the generated signals to an adder 303 connected to the first transmission antenna 304. The adder 303 adds the input signals and outputs the added signal to the first transmission antenna 304, thereby transmitting the signal to the receiver 310.

Because a block for an $M_T^{th}$ transmission antenna 308 is equal to a block for the first transmission antenna 304, a detailed description thereof will be omitted. The pilot signals and the transmission signals transmitted through the transmission antennas 304 through 308 are delivered to each of reception antennas 311 through 314. That is, the pilot signal and the transmission signal transmitted through the first transmission antenna 304 are delivered to a first reception antenna 311 and an $M_R^{th}$ reception antenna 314. Similarly, the pilot signal and the transmission signal transmitted through the $M_T^{th}$ transmission antenna 308 are delivered to the first reception antenna 311 and the $M_R^{th}$ reception antenna 314. In FIG. 3, the signal delivery is shown by arrows.

A structure of the receiver 310 will now be described. It is assumed that the receiver 310 has $M_R$ reception antennas. Therefore, the receiver 310 includes the first reception antenna 311 through the $M_R^{th}$ reception antenna 314. Each of the reception antennas 311 through 314 includes a pilot signal estimator for the corresponding transmission antenna. Because the reception antennas 311 through 314 are all equal to each other in structure, only the structure of the first reception antenna 311 will be described for simplicity.

The signal received from the first reception antenna 311, as described above, includes the transmission signals and pilot signals transmitted from the transmission antennas 304 through 308. In FIG. 3, a structure for processing the transmission signals is not shown and only the structure for processing the pilot signals is shown for simplicity. The first reception antenna 311 receives all of the signals from the first transmission antenna 304 through the $M_T^{th}$ transmission antenna 308. Therefore, the pilot signals received at the first reception antenna 311 are input to each of pilot signal estimators 312 through 313. Each of the pilot signal estimators 312 through 313 separates the pilot signal received from each transmission antenna and estimates a signal from the corresponding transmission antenna. The signal from each transmission antenna can be separated because the pilot signals transmitted from the transmission antennas are orthogonal to each other.

A process performed in the pilot signal estimator 312 for the first transmission antenna, connected to the first reception antenna 311, will now be described herein below. If a channel between the first transmission antenna 304 and the first reception antenna 311 is represented by $h_{11}$, a cannel estimated by the pilot signal estimator 312 for the first transmission antenna, connected to the first reception antenna 311, can be represented by $\tilde{h}_{11}$. A channel received at the first reception antenna 311, transmitted from the $M_T^{th}$ transmission antenna 308, can be estimated in the same manner. The estimation results for the pilot channels from the pilot signal estimators 312, 313, 315 and 316 for the corresponding transmission antennas, connected to the reception antennas 311 through 314, are collected. The collection is performed by a channel matrix estimator 317. That is, the pilot signal estimators 312, 313, 315 and 316 for the corresponding transmission antennas output the estimation results for the pilot channels to the channel matrix estimator 317. The channel matrix estimator 317 can calculate an estimated matrix $\tilde{H}$ for a channel H of a multi-antenna system using a channel function of the collected estimated pilot channels. An element $\tilde{h}_{ij}$ in an $i^{th}$ row and a $j^{th}$ column of the estimated matrix means a channel status between a $j^{th}$ transmission antenna and an $i^{th}$ reception antenna.

After estimating the matrix using the channel status between reception antennas, the channel matrix estimator 317 outputs the estimated value to a basis transform equivalent channel estimator 318. Then the basis transform equivalent channel estimator 318 must estimate equivalent channels for all of basis transform matrixes in a basis transform matrix set S. Therefore, the basis transform equivalent channel estimator 318 estimates equivalent channels for all of the basis transform matrixes based on the matrix $\tilde{H}$ calculated by the channel matrix estimator 317. Equation (1) below shows a method for calculating an equivalent channel matrix $\tilde{H}_g$ for a basis transform matrix $E^{(g)}$.

$$\tilde{H}_g = \tilde{H} E^{(g)} \quad (1)$$

Using Equation (1), equivalent channels $\{\tilde{H}_1, \tilde{H}_2, \ldots, \tilde{H}_G\}$ for all of the basis transform matrixes can be estimated. The equivalent channels estimated by the basis transform equivalent channel estimator 318 are input to a feedback signal decider 319. The feedback signal decider 319 determines a basis transform matrix to be fed back to the transmitter and a CQI corresponding to the feedback basis transform matrix using the estimated equivalent channels for all of basis transform matrixes. The feedback signal decider 319 can determine a basis transform matrix using one of the following several methods.

A first method can determine a basis transform matrix on the basis of a sum of the expected amounts of transmissions on the assumption that all of the bases are allocated thereto. A second method can determine a basis transform matrix on the basis of the expected amount of transmission on the assumption that only one or two bases are allocated thereto. The feedback signal decider 319 determines a basis transform matrix for maximizing the amount of transmission using the estimated equivalent matrix, and transmits the selected basis transform matrix. Although there are other possible methods, a description of a criterion for determining a preferred basis transform matrix will be omitted herein.

A description will now be made of a process in which the receiver estimates channels and feeds back the estimated values to the transmitter according to the foregoing method.

Figure 4:
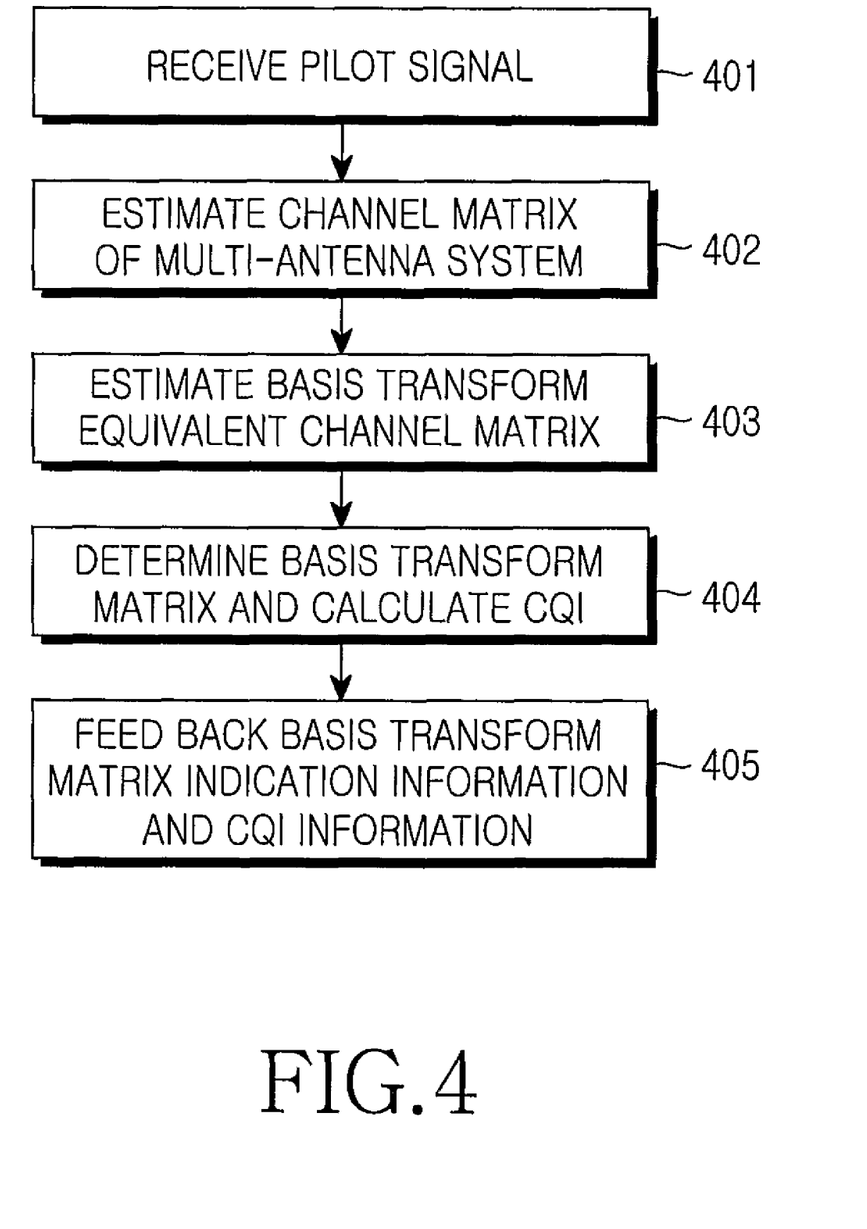
FIG. 4 is a flowchart illustrating a process in which a receiver estimates forward channels and reports the results according to an embodiment of the present invention.

FIG. 4 is a flowchart illustrating a process in which the receiver estimates forward channels and reports the results. With reference to FIGS. 3 and 4, a detailed description will now be made of a process in which the receiver estimates forward channels and reports the results.

In step 401, a receiver receives pilot signals. As described in connection with FIG. 3, the receiver receives the pilot signals transmitted from transmission antennas at each of the reception antennas. Because the pilot signals transmitted from the transmission antennas are orthogonal with each other, the receiver can distinguish the signals received at the reception antennas. After receiving the pilot signals through the reception antennas, the receiver calculates an estimated matrix $\tilde{H}$ for a channel H of a multi-antenna system in step 402. The calculation of the estimated matrix is performed in the channel matrix estimator 317 of FIG. 3.

Thereafter, in step 403, the receiver estimates equivalent channels for all of basis transform matrixes by applying the estimated channel matrix of the multi-antenna system to Equation (1). The equivalent channel estimation process is performed in the basis transform equivalent channel estimator 318 of FIG. 3. Thereafter, in step 404, the feedback signal decider 319 of the receiver can determine a preferred basis transform matrix using the equivalent channel values estimated for all of basis transform matrixes, and calculate a CQI at each basis created when a corresponding transform matrix is applied. Herein, the CQI is calculated using a Minimum Mean Square Error (MMSE) reception method or an interference cancellation-based reception method on the assumption that the estimated equivalent channel for the determined basis transform matrix has the current channel status. Thereafter, in step 405, the receiver transmits information indicating the preferred basis transform matrix and a CQI value corresponding thereto, calculated in step 404, to the transmitter through a feedback channel.

[2] Structure of Transmitter

Figure 5:
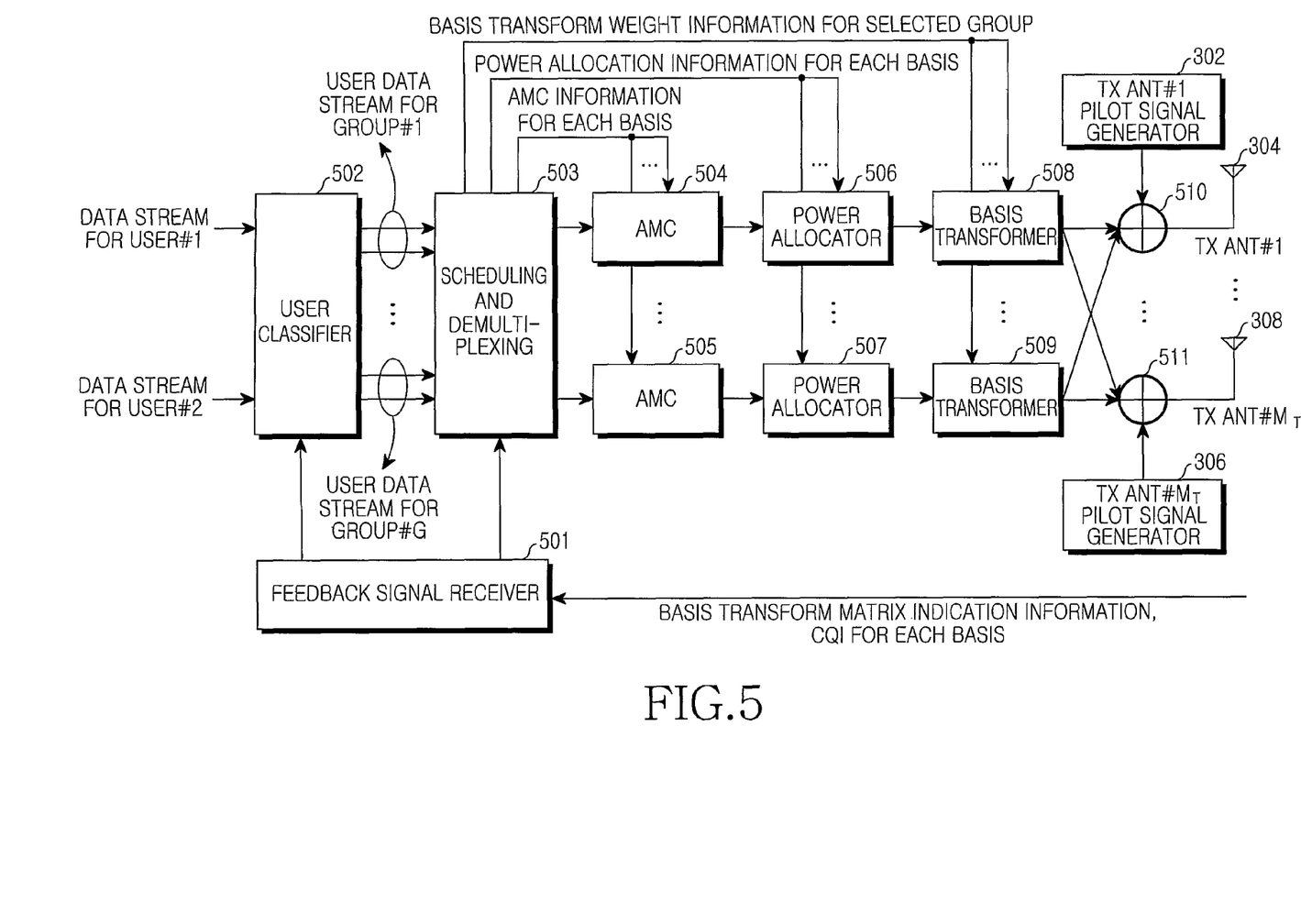
FIG. 5 is a block diagram illustrating an internal structure of a transmitter for a multi-antenna system according to an embodiment of the present invention.

FIG. 5 is a block diagram illustrating an internal structure of a transmitter for a multi-antenna system according to an embodiment of the present invention. With reference to FIG. 5, a detailed description will now be made of the structure and operation of a transmitter for a multi-antenna system according to an embodiment of the present invention.

The transmitter has a feedback signal receiver 501 for receiving the feedback signal transmitted by the receiver. A part for radio frequency (RF)-processing the feedback signal is not illustrated in FIG. 5 for simplicity. The feedback signal receiver 501 receives basis transform matrix indication information and a CQI for each basis. The feedback signal receiver 501, upon receiving the feedback signal, provides the basis transform matrix indication information to a user classifier 502 according to the basis transform matrix. The feedback signal receiver 501 outputs the feedback signal to a scheduling and demultiplexing block 503 that determines and demultiplexes substreams for users, for transmitting signals of user groups. The present invention divides users into a plurality of user groups, and performs scheduling and demultiplexing according to user group. A description thereof will be given later.

A description will now be made of an operation performed after the basis transform matrix indication information and the CQI information of each basis are received from the feedback signal receiver 501. The user classifier 502 receives a total of K user data streams. The user classifier 502 receiving the K user data streams classifies users into a plurality of groups according to the basis transform matrix indication information received from the feedback signal receiver 501. In FIG. 5, the user classifier 502 classifies the users into G groups, by way of example. Data for the users is divided into groups, and then input to the scheduling and demultiplexing block 503.

The scheduling and demultiplexing block 503 receives the streams classified according to user group, and determines user data of which group it will transmit. That is, the scheduling and demultiplexing block 503 performs scheduling for user data transmission. The scheduling process is performed based on the CQI information fed back by each of the users. The user data classified into different groups in the scheduling process cannot be transmitted for the same time. Therefore, only the streams for the users classified into the same group, i.e., the users having the same preferred basis transform matrixes, can be transmitted simultaneously. A detailed description of the scheduling and demultiplexing process will be given later together with a description of an operation of the transmitter. The scheduling and demultiplexing block 503 outputs the information received from a receiver for each of the users through the feedback signal receiver 510, to AMC blocks 504 through 505, power allocators 506 through 507, and basis transformers 508 through 509. A detailed description thereof will be provided later.

The scheduling and demultiplexing block 503 delivers per-basis AMC information received from a corresponding user to the AMC blocks 504 through 505. The per-basis AMC information, which is the information received from a receiver for a user as described above, carries information on adaptive modulation and coding methods for the data to be transmitted to the user according to the characteristic of an antenna preferred by the data to be transmitted to the corresponding user.

The scheduling and demultiplexing block 503 delivers per-basis power allocation information to the power allocators 506 through 507 that transmit corresponding user data to allocate transmission power for each antenna during transmission of the user data. The per-basis power allocation information can be set using CQI information received from a receiver for the corresponding user. The scheduling and demultiplexing block 503 carries basis transform weight information for a selected group to each of the basis transformers 508 through 509 to transmit the user data to be transmitted at the present time.

The user data output from the scheduling and demultiplexing block 503 is data streams appropriately demultiplexed to be transmitted through each basis. The demultiplexed substreams can be either the substreams demultiplexed from a one user stream or the substreams mapped to a plurality of user streams on a one-to-one basis. The demultiplexed substreams are input to the AMC blocks 504 through 505. The AMC blocks 504 through 505 adaptively modulate and code the streams using the per-basis AMC information received from the feedback signal receiver 501. The signals AMC-processed in the AMC blocks 504 through 505 are input to the power allocators 506 through 507. The power allocators 506 through 507 allocate power for the input signals using the per-basis power allocation information received from the feedback signal receiver 501.

The power allocated by the power allocators 506 through 507 is determined according to whether there is any data stream transmitted through the corresponding basis. The output signals to which power is allocated by the power allocators 506 through 507 are input to the basis transformers 508 through 509, respectively. That is, if data streams are transmitted through only n bases among a total of $N_g$ bases, the power allocators 506 through 507 uniformly allocate the total transmission power $P_T$ allocated for the corresponding user to the n effective bases, and allocate no power to the remaining $(N_g-n)$ bases. Therefore, in order to increase the transmission efficiency, it is preferable to allocate the higher power to the basis through which the greater amount of information is transmitted that is, the power allocators 506 through 507 require information on whether there is any data stream transmitted through a particular basis, and on the amount of the data stream if transmitted. This information is provided form the scheduling and demultiplexing block 503. A simple power allocation method allocates power of $P_T/n$ to each of the n effective bases, and allocates no power to the remaining $(N_g-n)$ bases. This method is not an optimal power allocation method in terms of the spatial domain multiplexing technique. However, if the power is allocated in the optimal way, it is not possible to estimate power allocated to other users, making it difficult to implement the spatial domain multiple access technique.

Because the AMC technique is used, the method of uniformly allocating power only to the bases through which data streams are transmitted is not so different in performance from the optimal power allocation method of the spatial domain multiplexing technique.

The substreams input to the basis transformers 508 through 509 by the foregoing method are subject to basis transform to be matched to corresponding bases in the basis transformers 508 through 509. The method of performing basis transform follows the basis transform method determined by the scheduling and demultiplexing block 503. Therefore, the scheduling and demultiplexing block 503 must provide basis transform matrixes to the basis transformers 508 through 509.

The output signals of the basis transformers 508 through 509 are input to adders 510 through 511, together with transmission pilot signals to be transmitted via corresponding transmission antennas 304 through 308. Then the adders 510 through 511 add up their input signals, and output the added signals to their associated antennas 304 through 308. In this manner, the transmitter can transmit transmission signals to the receiver per antenna.

A description will now be made of process of transmitting data in a multi-antenna system according to an embodiment of the present invention.

Figure 6:
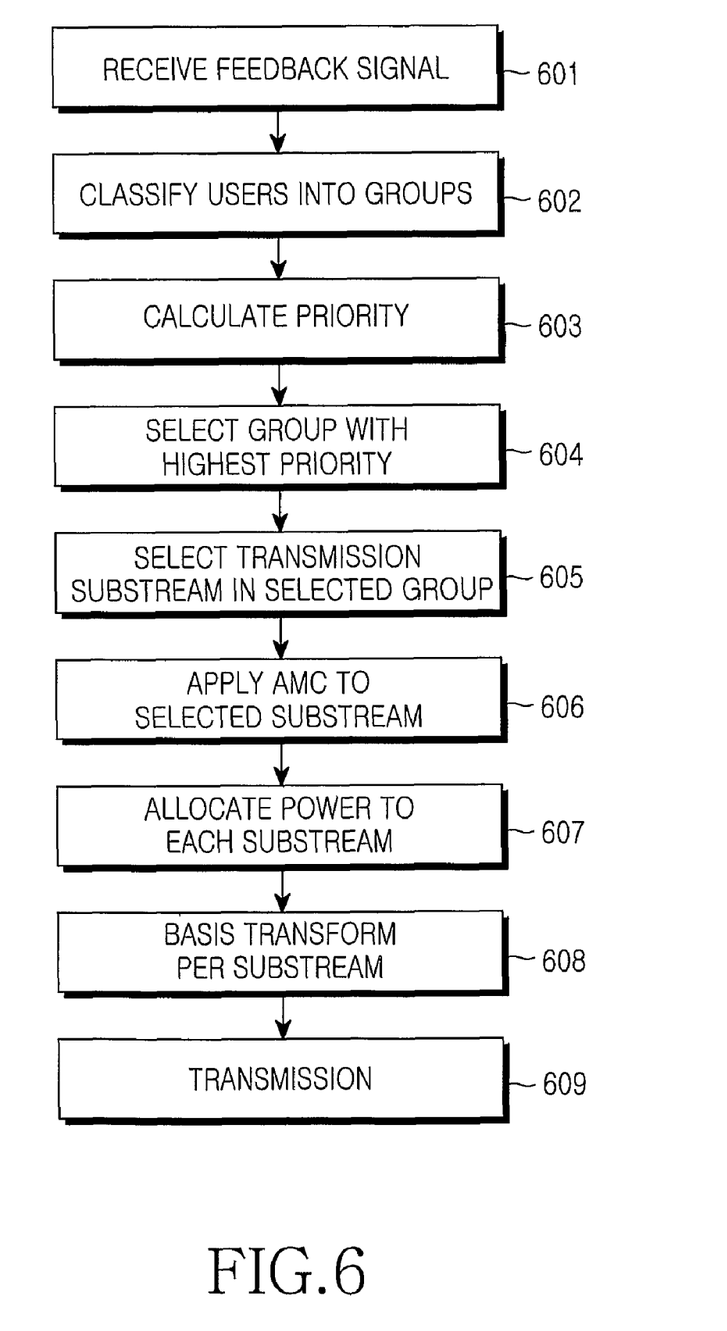
FIG. 6 is a flowchart illustrating a process of transmitting data from a transmitter to a receiver in a multi-antenna system according to an embodiment of the present invention.

FIG. 6 is a flowchart illustrating a process of transmitting data from a transmitter to a receiver in a multi-antenna system according to an embodiment of the present invention. With reference to FIG. 6, a detailed description will now be made of a process of transmitting data from a transmitter to a receiver in a multi-antenna system according to an embodiment of the present invention.

In the following description, the present invention proposes a method capable of internally applying a spatial diversity technique, a spatial domain multiplexing technique, and a spatial domain multiple access technique in one multi-antenna system. To this end, there is a need for a method of managing both of a medium access control (MAC) layer for performing scheduling and a physical layer that applies the multi-antenna technique. The process will now be described in detail with reference to the accompanying drawing.

In step 601, a transmitter receives basis transform matrixes and CQI values corresponding thereto, being fed back from all of terminals. In step 602, the transmitter classifies users based on the feedback information. Herein, the users are classified according to users that prefer the same basis. That is, the transmitter classifies the users according to user group that prefers the same basis transform. The user classification process is performed by the user classifier 502 of FIG. 5. After classifying the user groups, the transmitter calculates priority in step 603. The priority has the following three types. A first priority type is user priority calculated according to user. A second priority type is substream priority calculated according to substream. A third priority type is group priority calculated according to group. The user priority and the group priority can be calculated based on either a separate criterion or the user priority. A detailed description of the priority calculation method will be omitted herein.

After calculating the priority in the foregoing method, the transmitter selects a group with higher group priority in step 604. Thereafter, in step 605, the transmitter selects transmission substreams in the selected group. The selection of the transmission substreams is achieved according to one or both of the user priority and the substream priority. The transmission substreams are determined by a scheduling algorithm.

Therefore, the transmission substream can be either a single substream or multiple substreams. If it is determined that only the single substream is transmitted, the multi-antenna system proposed in the present invention operates with the spatial diversity technique. The process of selecting user or user group and selecting transmission substream is performed by the scheduling and demultiplexing block 503 of FIG. 5.

However, if the scheduling process determines to transmit multiple substreams, the corresponding substreams can be either the substreams demultiplexed from a data stream for a single user or the substreams multiple-accessed from data streams for different users. The multi-antenna system proposed in the present invention operates with the spatial domain multiplexing technique when scheduling is performed such that substreams demultiplexed from a data stream for one user are transmitted, and operates with the spatial domain multiple access technique when data streams for different users are selected as transmission substreams.

After determining the transmission substreams, the transmitter applies an appropriate AMC process to each of the determined substreams in step 606. That is, the amount of transmission information depends on a channel status of a basis between a transmission antenna and a reception antenna, through which the substream is transmitted. Therefore, the transmitter adaptively performs modulation and coding according to a characteristic of a basis between a transmission antenna and a reception antenna, through which the substream is to be transmitted. After performing the AMC, the transmitter allocates power to each of the AMC-processed substream signals in step 607. The transmitter allocates no power to the bases through which no substream is transmitted, and uniformly allocates power to the bases through which substreams are transmitted. The power allocation process is performed in the power allocators 506 through 507 of FIG. 5.

After the power allocation, the transmitter performs basis transform such that each substream is transmitted through the corresponding basis, in step 608. The determined transmission substreams have the same basis transform matrixes. Therefore, for the basis transform, the transmitter uses the basis transform matrix determined in the process of determining a group in step 604. The process of performing basis transform is achieved in the basis transformers 508 through 509 of FIG. 5. Thereafter, in step 609, the transmitter transmits the basis-transformed substreams to the receiver through the transmission antennas.

[3] Embodiment

Figure 7:
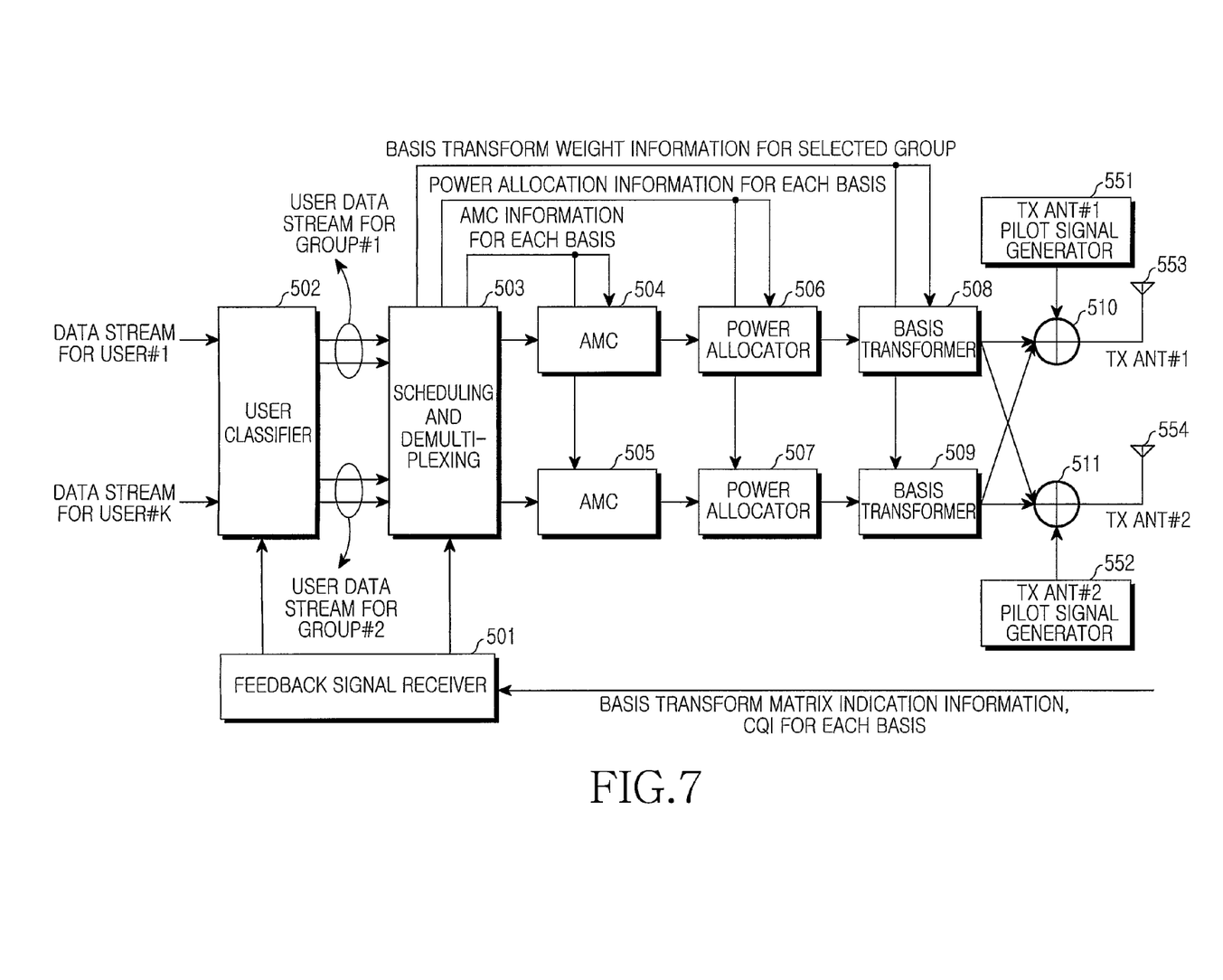
FIG. 7 is a block diagram illustrating a structure of a transmitter for a multi-antenna system according to an embodiment of the present invention.

FIG. 7 is a block diagram illustrating a structure of a transmitter for a multi-antenna system according to an embodiment of the present invention. With reference to FIG. 7, a detailed description will now be made of an operation of a transmitter for a multi-antenna system according to an embodiment of the present invention. The transmitter of FIG. 7 is equal in structure to the transmitter of FIG. 5 except that the transmitter of FIG. 7 has two transmission antennas. The same elements in the drawings are denoted by the same reference numerals.

Because the number $M_T$ of transmission antennas is 2, a basis transform matrix set of Equation (2) can be used.

$$S = \left\{ E^{(1)} = \frac{1}{\sqrt{2}} \begin{bmatrix} 1 & 1 \\ 1 & -1 \end{bmatrix}, E^{(2)} = \frac{1}{\sqrt{2}} \begin{bmatrix} 1 & 1 \\ i & -i \end{bmatrix} \right\} \quad (2)$$

In Equation (2), $i=\sqrt{-1}$. Basis transform matrixes $E^{(1)}$ and $E^{(2)}$ make two bases. That is, $N_1=N_2=2$. If a receiver for a user selects $E^{(1)}$ as a preferred basis transform matrix, a first basis and a second basis are created with weights of Equation (3).

$$e_1^{(1)} = \frac{1}{\sqrt{2}} \begin{bmatrix} 1 \\ 1 \end{bmatrix}, e_2^{(2)} = \frac{1}{\sqrt{2}} \begin{bmatrix} 1 \\ -1 \end{bmatrix} \quad (3)$$

If the user selects $E^{(2)}$ as a preferred basis transform matrix, a first basis and a second basis are created with weighs of Equation (4).

$$e_1^{(2)} = \frac{1}{\sqrt{2}} \begin{bmatrix} 1 \\ i \end{bmatrix}, e_2^{(1)} = \frac{1}{\sqrt{2}} \begin{bmatrix} 1 \\ -i \end{bmatrix} \quad (4)$$

The feedback signal receiver 501 receives basis transform matrix information g and CQI information, being fed back from each of user terminals. In the present invention, the preferred basis transform matrix information g is expressed with 1 bit, wherein g=0 indicates selection of $E^{(1)}$ and g=1 indicates selection of $E^{(2)}$. Each user terminal feeds back a CQI that can be obtained at each basis when the selected basis transform matrix is applied. In the present invention, because $N_1=N_2=2$, the receiver should always feed back two CQIs $\gamma_1$ and $\gamma_2$ to the transmitter regardless of which basis matrix is selected.

The user classifier 502 classifies users based on the preferred basis transform matrix information fed back from each user. The users that have fed back g=0 are classified into a group #1, and the users that have fed back g=1 are classified into a group #2. After the groups are determined in this manner, the scheduling and demultiplexing block 503 determines user data of which group it will transmit. First, the scheduling and demultiplexing block 503 calculates group priority, user priority, and substream priority. Because the priority calculation method is related to design of a scheduler, a description thereof will not be provided.

In the priority calculation process, the CQI information $\gamma_1$ and $\gamma_2$ fed back from each of the users are taken into consideration. With the use of the feedback CQI information, the scheduling and demultiplexing block 503 selects a group with the highest priority among the groups. If the group #1 is selected, the scheduling and demultiplexing block 503 selects transmission signals for the users in the group #1, and if the group #2 is selected, the scheduling and demultiplexing block 503 selects transmission signals for the users in the group #2. After completion of the group selection, the scheduling and demultiplexing block 503 determines which substream it will transmit through each basis, based on one or both of the user priority and the substream priority. The user data stream determined to be transmitted is demultiplexed into substreams to be transmitted through corresponding bases.

The demultiplexed substreams are subject to AMC in the AMC blocks 504 and 505 based on the feedback CQI information $\gamma_1$ and $\gamma_2$. The AMC-processed signals undergo power allocation in the power allocators 506 and 507. The power allocation is determined according to whether a data stream is transmitted through a corresponding basis. If a data stream is transmitted through only one of a total of 2 bases, the power allocators 506 and 507 allocate all of the power to one effective basis, and allocate no power to the other basis. If data streams are transmitted through both of the two bases, the power allocators 506 and 507 allocate half of the transmission power to each of the bases. Therefore, the power allocators 506 and 507 require information indicating whether there is any data stream transmitted through a particular basis, and receive the information from the scheduling and demultiplexing block 503. The power-allocated substreams undergo basis transform in the basis transformers 508 and 509 such that they are matched to the corresponding bases.

The basis transform matrix is determined according to the group selected by the scheduling and demultiplexing block 503. If the group #1 is selected, Equation (3) is applied to the basis transform matrix as a basis transform weight. If the group #2 is selected, Equation (4) is applied to the basis transform matrix as a basis transform weight. The output signals of the basis transformers 508 and 509 are added in adders 510 and 511 to the pilot signals to be transmitted, and then transmitted via corresponding transmission antennas 553 and 554.

In a cellular mobile communication environment, technology showing performance gain of the multi-antenna system for transmitting/receiving packet data differs according to channel status. That is, the spatial domain multiplexing technique can improve the performance if it is applied for the channels with a high quality and a low spatial correlation. However, the spatial diversity technique is superior to the spatial domain multiplexing technique in the situation where the channels have a low quality and a high spatial correlation. Therefore, the spatial domain multiple access technique differs in performance according to channel status of the receivers. Accordingly, the spatial diversity technique, the spatial domain multiplexing technique, and the spatial domain multiple access technique, which are operation techniques for the multi-antenna system, must be selectively applied taking the channel status for all of the users into an account. The novel multi-antenna system according to the present invention can adaptively implement the spatial diversity technique, the spatial domain multiplexing technique, and the spatial domain multiple access technique.

The present invention does not limit the number of reception antennas of each user terminal. This assumption is very useful in the actual system. Because a user using a single reception antenna cannot use the spatial domain multiplexing technique, a base station transmitter will use the spatial diversity technique or the spatial domain multiple access technique that transmits a single stream to the corresponding user. However, because a user using a plurality of reception antennas can use the spatial domain multiplexing technique, it can apply all of the spatial diversity technique, the spatial domain multiplexing technique, and the spatial domain multiple access technique. There is no need for a separate device for selecting one of the multi-antenna techniques.

As described above, the novel multi-antenna system according to the present invention uses the most effective multi-antenna technique according to the conditions of channels and users, contributing to an improvement of the transmission efficiency in the packet data system. In addition, the present invention can be applied to both of a receiver with a single antenna and a receiver with multiple antennas without restriction of the device.

What is claimed is:

1. An apparatus for transmitting packet data in a wireless communication system that receives channel status information between multiple transmission antennas and multiple reception antennas as feedback information, comprising:
   a feedback signal receiver for receiving the feedback information including a basis transform equivalent channel matrix information and channel quality information (CQI) corresponding thereto, from all of a plurality of terminals;
   a user classifier for classifying users into groups based on the basis transform equivalent channel matrix and classing each of users data streams according to the classified groups;
   a scheduling and demultiplexing block for demultiplexing each of the classified user data streams into substreams, selecting at least one of a group and at least one of a demultiplexed substream using the CQI; and
   a transmitter for transmitting the at least one of the selected substreams.

2. The apparatus of claim 1, further comprising:
   an AMC block for modulating and coding the selected substream according to AMC information;
   a power allocator for allocating transmission power to the AMC-processed substream according to power allocation information; and
   a basis transformer for basis transforming on each of the power-allocated substreams according to basis transform weight information.

3. The apparatus of claim 2, further comprising:
   a transmission antenna pilot signal generator for generating a pilot signal to be transmitted through each of the multiple transmission antennas; and
   adders allocated to their associated antennas, for adding the per-transmission antenna pilot signal to the signal output from the basis transformer.

4. A reception apparatus for generating feedback information for channels between multiple transmission antennas and multiple reception antennas in a wireless communication system including the multiple transmission antennas, the system transmitting packet data through the multiple transmission antennas, each transmission antenna transmitting packet data without forming a pilot signal, and receiving the packet data using the multiple reception antennas, the apparatus comprising:
   pilot signal estimators for estimating each of a plurality of pilot signals received from the multiple transmission antennas in each of the multiple reception antennas;
   a channel matrix estimator for generating a channel estimation matrix from a transmitter to the multiple reception antennas using pilot signals estimated for the multiple reception antennas;
   a basis transform equivalent channel matrix generator for generating a basis transform equivalent channel matrix for packet data transmitted from a transmitter using the generated channel estimation matrix; and
   a feedback signal decider for determining a basis transform equivalent channel matrix being transmitted to the transmitter from the basis transform equivalent channel generator, and generating feedback information including the determined basis transform equivalent channel matrix and channel quality information (CQI) corresponding thereto and transmitting to the transmitter,
   wherein the basis transform equivalent channel matrix is used to classify users into groups at the transmitter.

5. The reception apparatus of claim 4, wherein the basis transform equivalent channel matrix generator estimates an basis transform equivalent channel matrix for all of basis transform matrixes in a basis transform matrix set.

6. The reception apparatus of claim 5, wherein if a matrix calculated from the channel matrix estimator is represented by H and a basis transform matrix $E^{(g)}$ is used, the basis transform equivalent channel matrix $H_g$ is calculated as $H_g = HE^{(g)}$.

7. A method for transmitting packet data in a wireless communication system that receives channel status information between multiple transmission antennas and multiple reception antennas as feedback information, comprising the steps of:

receiving feedback information including a basis transform equivalent channel matrix information and channel quality information (CQI) corresponding thereto, from all of a plurality of terminals;

classifying users into groups based on the basis transform equivalent channel matrix information and classifying each of user data streams according to the classified groups;

demultiplexing each of the classified user data streams into substreams;

selecting at least one of the groups and at least one of the demultiplexed substreams using the CQI; and transmitting the at least one of the selected substreams.

8. A reception method for generating feedback information for channels between multiple transmission antennas and multiple reception antennas in a wireless communication system including the multiple transmission antennas, the system transmitting packet data through the multiple transmission antennas, each of the transmission antennas transmitting the packet data without forming a pilot signal, and receiving the packet data using the multiple reception antennas, the method comprising the steps of:

estimating each of a plurality of pilot signals received from the multiple transmission antennas in each of the multiple reception antennas;

generating a channel estimation matrix from a transmitter to the multiple reception antennas using pilot signals estimated for the multiple reception antennas;

generating basis transform equivalent channel matrix for packet data transmitted from the transmitter using the generated channel estimation matrix;

determining an basis transform equivalent channel matrix being transmitted to the transmitter from the basis transform equivalent channel generator; and generating feedback information including the determined basis transform equivalent channel matrix and channel quality information (CQI) corresponding thereto and transmitting to the transmitter, wherein the basis transform equivalent channel matrix is used to classify users into groups at the transmitter.

9. The reception method of claim 8, wherein the step of generating a basis transform equivalent channel matrix comprises the step of estimating an basis transform equivalent channel matrix for all of basis transform matrixes in a basis transform matrix set.

10. The reception method of claim 9, wherein if the channel estimated matrix is represented by H and a basis transform matrix $E^{(g)}$ is used, the basis transform equivalent channel matrix $H_g$ is calculated as $H_g = H E^{(g)}$.

11. The method for transmitting packet data of claim 7, wherein the step of transmitting comprising:

performing adaptive modulation and coding (AMC) on each of the selected substreams;

allocating power to the AMC-processed substreams;

performing basis transform on each of the power-allocated substreams according to a basis transform weight information of the selected substreams; and transmitting the power-allocated substreams.

12. The method for transmitting packet data of claim 11, the method further comprising;

generating a pilot signal to be transmitted through each of the multiple transmission antennas; and adding the per-transmission antenna pilot signal to the basis transformed substream.

* * * * *